(12) United States Patent
Westmijze et al.

(10) Patent No.: US 8,283,431 B2
(45) Date of Patent: Oct. 9, 2012

(54) INCREASED POLYMERIZATION REACTOR OUTPUT BY USING A SPECIFIC INITIATOR SYSTEM

(75) Inventors: Hans Westmijze, Bathmen (NL); Lambertus Meulenbrugge, Westervoort (NL); Koen Antoon Kornelis Vanduffel, Deventer (NL); Andreas Petrus Van Swieten, Velp (NL)

(73) Assignee: Akzo Nobel NV, Arnhem (NL)

( * ) Notice: Subject to any disclaimer, the term of this patent is extended or adjusted under 35 U.S.C. 154(b) by 1571 days.

(21) Appl. No.: 10/553,971

(22) PCT Filed: Apr. 27, 2004

(86) PCT No.: PCT/EP2004/004500
§ 371 (c)(1),
(2), (4) Date: Nov. 8, 2005

(87) PCT Pub. No.: WO2004/096871
PCT Pub. Date: Nov. 11, 2004

(65) Prior Publication Data
US 2006/0149014 A1    Jul. 6, 2006

(30) Foreign Application Priority Data
May 1, 2003  (EP) .................................... 03076390

(51) Int. Cl.
*C08F 14/06* (2006.01)
(52) U.S. Cl. .............. 526/344; 526/79; 526/80; 526/81; 526/86; 526/227; 526/228; 526/230.5
(58) Field of Classification Search .................... 526/86, 526/344, 344.2, 910
See application file for complete search history.

(56) References Cited

U.S. PATENT DOCUMENTS

| 3,451,985 | A |   | 6/1969 | Mahlo |
| 3,778,422 | A | * | 12/1973 | Farber et al. ................... 526/228 |
| 6,274,690 | B1 | * | 8/2001 | Hoshida et al. ............... 526/344 |
| 6,384,155 | B1 | * | 5/2002 | Van Swieten et al. .......... 526/79 |
| 2003/0199656 | A1 |   | 10/2003 | Westmijze et al. |
| 2005/0054795 | A1 |   | 3/2005 | Westmijze et al. |
| 2005/0080207 | A1 |   | 4/2005 | Meulenbrugge et al. |

FOREIGN PATENT DOCUMENTS

| DE | 1 570 963 | | 3/1972 |
| DE | 30 29 211 A1 | | 3/1982 |
| EP | 0 096 365 A1 | | 12/1983 |
| JP | 7-82304 | * | 3/1995 |
| JP | A 7-82304 | | 3/1995 |
| WO | WO 00/17245 | | 3/2000 |
| WO | WO 03/054040 A1 | | 7/2003 |

OTHER PUBLICATIONS

Akzo Nobel, Trigonox 187-C30 product data sheet, Aug. 2008.*
Akzo Nobel, Trigonox EHP product data sheet, Aug. 2008.*
U.S. Appl. No. 10/552,437, filed Nov. 5, 2005, Boevenbrink et al.

* cited by examiner

*Primary Examiner* — Richard A Huhn
(74) *Attorney, Agent, or Firm* — Timothy D. Meade

(57) ABSTRACT

The invention pertains to a process to polymerize one or more monomers wherein at most 90% w/w of a safely useable amount of a first initiator is used and a second initiator is dosed at least after the start of the polymerization, in an amount such that essentially the full cooling capacity of the polymerization reactor is used, resulting in a cost efficient process to make polymers, particularly polymers comprising polymerized vinyl chloride.

12 Claims, No Drawings

INCREASED POLYMERIZATION REACTOR OUTPUT BY USING A SPECIFIC INITIATOR SYSTEM

The present invention relates to a process to polymerize one or more monomers in a reactor with a certain cooling capacity, wherein said cooling capacity is limiting the space-time yield of the reactor.

DE-OS-1 570 963 discloses to dose an initiator, optionally mixed with a solvent, to the mixture to be polymerized via a stream of water. The organic peroxides that are exemplified in this patent application are peroxydicarbonates and acetyl-cyclohexyl-sulfonyl-peroxide (ACSP). This process of DE-OS-1 570 963 was found to solve a number of problems in the industry. However, the process still suffers from insufficient control of the heat peak of the polymerization reaction and a related less than optimal space-time yield of the reactor due to cooling capacity restrictions. Accordingly, a different process not suffering from these drawbacks is desired.

Similarly, EP-A-0 096 365 discloses how a peroxide is added in three parts during the polymerization. Again, difficulties in controlling the heat that is subsequently generated are reported.

JP-A-07082304 discloses a process wherein a first peroxide is used at the start of the polymerization. Later in the process, when a reflux condenser is used as an additional cooling device, a second peroxide is dosed to the reactor to more efficiently use the additional cooling capacity of the condenser. Only a limited amount of the second peroxide can be used due to the fact that the first peroxide is still used in a conventional amount. By doing so the polymerization time is reduced from 5 hours and 3 minutes for the conventional process, in which only the first peroxide is used, to 4 hours and 17 minutes for the process wherein additionally the second peroxide is dosed. Although a significant improvement over the prior art, the time gain is still considered less than desired. Even higher time-space yield gains are being looked for.

Furthermore, the above-mentioned processes of the prior art are not very suitable for increasing the space-time yield of very large polymerization reactors, particularly those of at least 15 m$^3$, more particularly those of at least 20 m$^3$, wherein safety margins are maintained to prevent the polymerizing content from "running away", meaning that due to excessive heat development the reactor content is heated to above its set temperature, causing more of the conventional peroxide to decompose, which causes the polymerization rate to further increase, thus auto-acceleration occurs up to the point that the reactor content has to be stopped or dumped or it will rupture the reactor.

The current invention relates to a new process wherein these problems have largely been solved. More particularly, we have found that by selecting the proper amount of initiator that is dosed at the beginning of the polymerization and the proper dosing conditions for subsequently added initiator, it is possible to obtain a polymerization reaction where the rate of polymerization can be very well controlled and therefore the heat of polymerization can be kept at the maximum cooling capacity, allowing optimum reactor space-time yield, very efficient peroxide usage, and very low residual peroxide levels in the resin after polymerization. Furthermore, the fact that less of a conventional first initiator is dosed at the start of the polymerization, it was found that the distribution of said first initiator over the monomer was improved. Especially for the suspension and emulsion polymerization process this was found to result in polymer particles with less defects, such as fish-eyes, that are considered to be caused by too high peroxide concentration in a monomer droplet. This effect can be further augmented by metering both the initiator and a protective colloid at the same time. Additionally, the porosity of the polymer can be enhanced and better controlled through selection of the appropriate protective colloid and the way in which the protective colloid and/or the peroxide are metered.

The new process is characterized in that, compared to a process which is run at its maximum rate with all initiator being added at the start of the polymerization, only up to 90 mole % of said initiator (or mixture of initiators) is added at the start of the polymerization and a second initiator, which is less temperature stable than the first initiator that is added at the start, said second initiator having a half-life from 0.0001 hour to 1.0 hour at the polymerization temperature, is dosed to the polymerizing mixture in an amount, and preferably at a varying rate, such that at least 92, preferably at least 96, more preferably at least 98% of the maximum cooling capacity is used during at least a period of time wherein at least 10% by weight (% w/w), preferably 20% w/w, more preferably at least 30% w/w, most preferably at least 40% w/w of the monomer is polymerized. Preferably the second initiator is dosed in such a way that the maximum cooling capacity is used in a period of time wherein at least 10% by weight (% w/w), preferably 20% w/w, more preferably at least 30% w/w, most preferably at least 40% w/w of the monomer is polymerized, whereby the actual temperature of the polymerizing mixture is kept at the desired temperature plus or minus 0.2° C., because the more the maximum cooling capacity is being used, the more efficient is the polymerization process. The dosing of the second initiator in conjunction with the use of the first initiator allows for an unprecedented i) accurate control of the polymerization rate and related polymerization heat generation (and, accordingly, also the polymerization temperature) by controlling the peroxide dosing rate, ii) space-time yield of the reactor, and iii) very economic initiator usage.

If the amount of initiator being added at the start of the polymerization is carefully chosen and the second initiator is dosed according to the invention, then it is furthermore found possible to significantly reduce or remove the run-away safety margins that were necessary in the conventional process and the process can actually run at such a rate that the heat of polymerization is very close to, or it may even temporarily exceed, the cooling capacity, without that such a run-away is observed. In this respect, reference is made to JP-A-07082304 (see Example 1) in which conventional safety margins are being maintained of more than 15% of the total cooling capacity. In a process according to the invention the actual temperature of the reacting mixture typically does not reach a temperature that is more than 6° C. above the desired polymerization temperature. Preferably, the overshoot of the temperature of the polymerization mixture is less than 4° C., more preferably it is less than 2° C., even more preferably it is less than 1° C. Most preferably, the actual temperature of the polymerizing mixture is kept at the desired temperature plus or minus 0.2° C.

The amount of initiator being added at the start of the polymerization should be at most 90% by weight (% w/w) of the maximum amount of said initiator that can be used in the identical process that is run at the maximum cooling capacity and whereof the temperature is not exceeding the set temperature due to an excess of polymerization heat. If more than this maximum amount of said initiator is used, the polymerization heat exceeds the heat transfer capacity of the reactor and the reactor content will heat up to a temperature above the maximum allowable polymerization temperature. Since such an overshoot in temperature will cause a more rapid decomposition of the initiator, the temperature may even increase further, up to a point where the reaction runs away and becomes uncontrollable and hazardous. For this reason this maximum amount of initiator is called the safely useable amount. Preferably it is at most 80% w/w of said safely useable amount, more preferably at most 70% w/w, and most preferably at most 65% w/w. The lower the amount of first initiator the better the controlling of the polymerization rate (and, accordingly, the heat of polymerization) during the process. Preferably at least 2% w/w, more preferably at least 5% w/w, most preferably at least 10% w/w of said safely useable amount of first initiator is used.

It is noted that the term "maximum cooling capacity" as used herein is used in its conventional meaning, being the amount of heat that can be removed from the polymerization reaction mixture when 1) said reaction mixture has a temperature equal to the preset polymerization temperature, and 2) the cooling capacity is at its maximum level under normal polymerization conditions (typically the situation wherein the cooling medium is flowing at its maximum rate at its lowest temperature under normal polymerization conditions).

The amount of the second initiator that is used is preferably at least 0.01% by weight (% w/w), more preferably at least 0.015% w/w, and most preferably more than 0.02% w/w, all based on the weight of the monomer that is polymerized in the process.

It is noted that WO 00/17245 discloses a process wherein initiators are dosed to a polymerization reactor at temperatures where essentially all the initiators have a half-life of from 0.05 to 1.0 hour. In non-prepublished application PCT/EP02/14518 extremely fast organic initiators with a half-life from 0.0001 hour to 0.050 hour at the polymerization temperature are used to give an improved control of the polymerization rate, higher polymerization rates, leading to an increased space-time yield of polymerization reactors, and results in the process rendering a polymer with very low residual initiator levels. However, these processes were found to require the use of high amounts of the fast or extremely fast peroxides because the initiator efficiency is below that of a conventional peroxide that is dosed at the start. With the present process, the amount of fast or extremely fast peroxide that is used is lower than the amount as disclosed in WO 00/17245 and PCT/EP02/14518. Also the total amount of active oxygen as needed in the present process, compared to the process of WO 00/17245 and PCT/EP02/14518 with the same polymerization time, was found to be reduced. Therefore, the present process is more economical and yields a polymer with less decomposition products of the initiator, hence a product with improved organoleptic properties, particularly smell. Also, it is known that residual decomposition products typically having a molecular weight of less than 250 Dalton may lead to fogging (the decomposition products evaporate from the resin and condense on another surface), which is undesired. Also, a rework of Example F of WO 00/17245 showed that only after 2.9 hours after the start of the heat-up, and only for an instant, the maximum cooling capacity was used. It was furthermore observed that the present process allows for a better distribution of the initiators over the monomer, which, particularly when the polymerization is a dispersion polymerization, such as an emulsion or suspension polymerization, results in a polymer with improved properties. Particularly the molecular weight and/or the molecular weight distribution of the polymer and/or the number of fish-eyes (resulting from the polymerization of a monomer droplet when a too high peroxide concentration was present) was found to be improved.

The process according to the invention is preeminently suited to polymerize monomer mixtures comprising vinyl chloride monomer (VCM). Preferably, the process according to the invention involves the polymerization of monomer mixtures comprising at least 50% by weight (% w/w) of VCM, based on the weight of all monomer. Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

It is to be understood that the word "dosing" is used to describe the step of adding initiator to the polymerizing reaction mixture at polymerization conditions. The dosing can be done intermittently during the polymerization, meaning that at least two portions of initiator are added to the reaction mixture, or it can be continuous, meaning that for a certain period of time the initiator is continuously added to the reaction mixture, or any combination of these techniques. Examples of a combination of such techniques include, for instance, a process wherein the initiator is first added continuously, then the addition is stopped, and then again it is added continuously. If an intermittent operation is selected, there are at least 2, preferably at least 4, more preferably at least 10, and most preferably at least 20 moments at the polymerization temperature at which the initiator is dosed. Most preferably, the peroxide is dosed continuously and/or intermittently from the start of the polymerization reaction, preferably after at least 5%, less preferred after at least 10%, even more less preferred after at least 20%, of the monomer(s) has already been polymerized and wherein during the dosing period at least 2, preferably at least 5, more preferably at least 10%, more preferably at least 20%, more preferably at least 40%, and most preferably at least 60%, of all monomer used in the process is polymerized.

In the process according to the invention, one or more initiators may be used as the second initiator, preferably the initiators are selected from organic peroxides, however, they may also be selected from conventional azo-initiators. Preferred examples of peroxides to be used as a second initiator in the process according to the invention are the following:

1,1,3,3-tetramethylbutylperoxy methoxy acetate, or hexanoyl pivaloyl peroxide for polymerization reactions at 35-70° C., preferably 40-65° C.

diisobutanoylperoxide, bis(tert-butylperoxy) oxalate or 2,2-bis(2,2-dimethylpropanoylperoxy)-4-methyl pentane, for polymerization reactions at 40-85° C., preferably 45-80° C.

α-cumyl peroxyneodecanoate, 2-(2,2-dimethylpropanoylperoxy)-2-(2-ethylhexanoylperoxy)-4-methyl pentane or 2,4,4-trimethylpentyl-2-peroxyneodecanoate, at polymerization temperatures of 53-99° C., preferably 60-95° C., and tert-amyl, tert-butyl peroxyneodecanoate or peroxydicarbonates, at polymerization temperatures of 62-107° C., preferably 75-100° C.

Other peroxides may also be used. Their half-lives can be determined by conventional thermal decomposition studies in monochlorobenzene, as well-known in the art (see for instance the brochure "Initiators for high polymers" with code 10737 obtainable from Akzo Nobel). The term polymerization temperature as used herein is used in its conventional connotation and represent the average temperature in the period in which the majority of the monomer is polymerized.

In case of doubt, it is the average temperature in the polymerization period in which not the first and not the last 5% of the monomer is polymerized.

Preferably, the first initiator that is added at the start of the polymerization, meaning when up to 10% of the monomer has polymerized, preferably when up to 5% of the monomer has polymerized, more preferably when up to 2% of the monomer has polymerized, even more preferably up to 1% has polymerized, most preferably when essentially no monomer has yet polymerized, has a half-life (when measured in monochlorobenzene at the polymerization temperature) of from 0.1 hour to 10.0 hour. More preferably, essentially all peroxide that is added at the start has a half-life of 0.2 to 5.0 hour, even more preferably 0.4 to 2.0 hour, most preferably 0.5 to 1.0 hour. The first initiator can be a mixture of initiators, provided that the weight average half life of the initiators in the mixture is within the 0.1-10 hour range. As said, the first initiator should have a longer half-life than the second initiator (at the polymerization temperature). Preferred first initiators include α-cumyl peroxyneodecanoate, 2-(2,2-dimethylpropanoylperoxy)-2-(2-ethylhexanoylperoxy)-4-methylpentane, 2,4,4-trimethylpentyl-2-peroxyneodecanoate, 3-hydroxy-1,1-dimethylbutyl peroxyneodecanoate, tert-amyl peroxyneodecanoate, tert-butyl peroxyneodecanoate, peroxydicarbonates (e.g. di-(2-ethylhexyl) peroxydicarbonate and di-(sec butyl)peroxydicarbonate), tert butyl peroxyneoheptanoate, tert butyl peroxy pivalate, tert amyl peroyxpivalate, and dilauroyl peroxide.

It is noted that when the term "polymerization temperature" is used, that this is the temperature at which the majority of all monomer (i.e. more than 50% w/w, preferably more than 60% w/w, most preferably more than 75% w/w of the monomer being polymerized) is being polymerized. It is known that the polymerization temperature set-point can be varied over time. Known polymerization temperature variations for polymerizations of vinyl chloride include an intentional higher temperature when the polymerization is started and/or a higher temperature upon pressured drop, both used to increase the reactor output. If a variation in the polymerization temperature is applied, then the polymerization temperature is considered to be the average temperature over time from the moment the polymerization temperature is reached until the pressure drop. It is noted that also in the process of the present invention, the polymerization temperature set-point during the start-up and pressure drop stages may be higher than the average polymerization temperature set-point.

Preferably, the second initiator that is dosed during the polymerization has a half-life (when measured in monochlorobenzene at the polymerization temperature) of from 0.0001 hour to 1.0 hour. More preferably, essentially all second initiator that is used has a half-life of 0.0005 to 0.8 hour, even more preferably 0.001 to 0.5 hour, most preferably 0.005 to 0.35 hour. The second initiator can be a redox initiation system. In such a case the reducing agent, the oxidizing agent, or both can be dosed in accordance with the invention. For such redox systems, the half-life of the redox system is the half-life as measured when all components of the system are present. However, in view of the fact that redox systems typically contain heavy metals and/or undesired reducing agents, the initiators of the present invention preferably are not such redox initiation systems. The second initiator may be a single initiator or a mixture of several initiators. If a mixture is used, all initiators of said mixture should fulfill the half-life requirement. If a mixture of second initiators is used, then preferably all initiator of the mixture is less temperature stable than the first initiator. If the first initiator is a mixture of initiators, then it is preferred that the second initiator is less temperature stable than all initiators in said mixture. If both the first and second initiator consists of a mixture of initiators, then it is preferred that the most thermally stable initiator of the second mixture is less stable than the least stable initiator of the first mixture.

In a preferred embodiment, the invention relates to a process wherein the polymerization mixture is formulated at a temperature below the reaction (polymerization) temperature and subsequently heated to reach said desired reaction temperature. In such a cold-start process the first initiator is added at the start as defined above. However, in such a process is can be beneficial to add also some of the more reactive second initiator during the heat-up phase, since it boost the heat up of the reaction mixture. Preferably, from 0-60% by weight (% w/w), more preferably 5-40% w/w, most preferably 5-20% w/w, of the peroxide, based on the total weight of the second initiator used during the polymerization, is present at the start of the heating-up phase, while the remainder is dosed over a period of at least 1, preferably 2, and more preferably 24 hours, depending on the polymerization time. More preferably, the remainder of the peroxide is dosed from the time the reaction mixture temperature is controlled at the desired reaction temperature. The use of a combination of the first initiator and a small amount of the second initiator from the start allows a fast heating up and start of the polymerization, since these initiators will already (partly) decompose during the heating of the polymerization mixture. When the polymerization mixture reaches the polymerization temperature, the remainder of the peroxide can be dosed to the mixture to control the further polymerization rate. Preferably, the dosing is continuous, preferably at a variable rate, since this allows the most accurate control of the polymerization rate and a constant polymerization heat output. The combination of the first and second initiator ensures the highest initiator efficiency and space-time reactor yield. This is particularly important for commercial reactors. Therefore the polymerization process according to the invention is preferably carried out in reactors of 15 m$^3$ or more.

In another preferred embodiment, the reaction mixture is formulated at or near the polymerization temperature. In this process, hereinafter called warm-start process, it is not necessary to add a certain amount of the second initiator at the start while the remainder is dosed over time. However, also in this warm-start process it can be beneficial to add up to 30% w/w, preferably up to 20% w/w, most preferably up to 10% w/w, of the second initiator immediately after formation of the reaction mixture, the remainder being dosed over time. If this procedure is used, the second initiator preferably is added as the last ingredient. This procedure is particularly preferred if a certain amount of polymerization inhibitor (a radical trapping species) is present in the reaction mixture. If such a radical scavenger is present, for instance because it is introduced with the monomer wherein it is typically used as a stabilizer, the initially dosed peroxide will react with said scavenger, thus preventing a delayed start of the polymerization reaction.

It is furthermore preferred that two steps are present in the process after the polymerization temperature is reached. In a first step with a duration of up to 90 minutes, preferably up to 60 minutes, and more preferably up to 45 minutes, and with a minimum duration of 1 minute, preferably of 5 minutes, more preferably of 10 minutes, from 1 to 60% w/w, preferably from 5 to 40% w/w, of all second initiator is dosed, such that the desired cooling capacity, preferably the maximum one, more preferably the maximum cooling capacity that is acceptable from a safety point of view, is reached at the end of this dosing step. Then, in a second step, the remaining initiator is dosed (added over time) in an amount and at a rate to control the polymerization in such a way that at least 92, preferably at least 96, more preferably at least 98% of the maximum cooling capacity is used during at least a period of time wherein at least 10% by weight (% w/w), preferably 20% w/w, more preferably at least 30% w/w, most preferably at least 40% w/w of the monomer is polymerized. Typically, this means that a variable dosing rate is used in the second step.

The total amount of first and second initiator to be used in a process according to the invention is within the range conventionally used in polymerization processes. Typically, from 0.01 to 1% w/w of initiator, more specifically 0.01-0.5% w/w, based on the weight of the monomer(s) to be polymerized, is used.

The part of the second initiator that is dosed to the reactor can be in the pure form or, preferably, in the form of a dilute solution or dispersion (such as a suspension or emulsion). One or more suitable solvents can be used to dilute the initiator. Preferably, such solvents are easily removed during the steps working up the polymer after the polymerization process (such as alcohols), or they are of such a nature that it is acceptable to leave them as a residue in the final polymer. Furthermore, it can be advantageous, but is not necessarily required, that such solvents do not adversely affect the thermal stability of the initiator dissolved therein, as can be verified by analyzing the half-life temperature of the initiator in said solvent. An example of a suitable solvent is isododecane. If an initiator dispersion is dosed, then the dispersion can be of either the initiator itself or of a solution of the initiator, preferably in said suitable solvents. Preferably, the dispersion is an aqueous dispersion. Preferably, the initiator is dosed in a concentration of 0.1 to 60% w/w, more preferably 0.5 to 25% w/w, and most preferably 2 to 15% w/w. The more dilute initiator solutions or dispersions ensure rapid mixing of the peroxide and the polymerization mixture, which leads to a more efficient use of the peroxide.

It can be beneficial to dose the second initiator together with a protective colloid.

To improve the time-space yield of the polymerization process, it is advantageous to dose at least part of the second initiator during the phase of the process after the start of the pressure drop and/or during the pressure drop, wherein the pressure drops due to depletion of the monomer. By the term "after the start of the pressure drop and/or during the pressure drop" is meant the time during which the pressure in the polymerization reactor drops, including the 30 minutes, preferably 20 minutes, more preferably 10 minutes, and most preferably 5 minutes, before the pressure drop is actually observed. Typically, the pressure drop is said to have occurred when the pressure is 0.2 bar, preferably 0.1 bar, lower than the (linearly extrapolated) pressure during the earlier part of the polymerization. The second initiator being added after the start of the pressure drop and/or during the pressure drop preferably has a half-life of less than 1 hour at the polymerization temperature, since than a relatively small residual amount of the initiator will remain in the polymer formed. In order to reduce the residual amount even more, it is preferred to add extremely fast second initiators having a half-life of less than 0.05 hour at the polymerization temperature. However, a slower initiator can also be employed. In that case it can be preferred to add a scavenger which is able to neutralize or destroy the residual initiator in any subsequent step to such an extent that the residual amount of the initiator in the polymer is acceptable. It is also contemplated to add a scavenger when fast and/or extremely fast peroxides are used.

Preferably, the dosing can be effected at any suitable entry point to the reactor. If water is added in the course of the polymerization process, for example to compensate for the shrinkage of the reactor content due to the polymerization reaction, it can be advantageous to use the line through which this water is dosed to also dose the initiator. It is noted that if the formation of the initiator is fast enough, one can dose the raw materials for said initiator into piping or hold-up vessels, from which the initiator is then fed into the polymerization mixture. Alternatively, but less desired, there is the process wherein the raw materials are added to the polymerization mixture. In all instances it can be beneficial to add stirring equipment and/or heat exchangers to the feed lines in order to optimize efficiency.

It is noted that, due to the use of the more stable first initiator, it is not preferred to conduct the present process such that 80% or more of all monomer is polymerized within a period of 2 hours. With such short polymerization times the amount of residual first initiator would be too high.

The polymerization process can be conducted either as a mass process wherein the reaction mixture is predominantly monomer or as a suspension process wherein the reaction mixture typically is a suspension of monomer in water, or as an emulsion or micro-emulsion process wherein the monomer typically is emulsified in water. Preferably, the present process is a mass, suspension or emulsion process. More preferably it is a suspension polymerization process. Most preferably it is a batch suspension process. In these processes the usual additives will have to be used. For example, if the monomer is present in the form of a suspension in water, the usual additives like surfactant(s), protective colloid(s), anti-fouling agent(s), pH-buffer(s), etc. may be present. Depending on the type of polymer desired, each of the above-mentioned processes may be preferred.

One or more protective colloids can be used in the process of the invention. Examples of suitable protective colloids are protective colloids such as polyvinyl alcohols (PVAs), which may, for example, be (partially) saponified polyvinyl acetates with a degree of hydrolysis of at least 40%, more preferably 60%, and most preferably 62%, and a degree of hydrolysis of at most 90%, more preferably 85%, and most preferably 80%. If for example two PVAs are employed, both PVAs may have a similar degree of hydrolysis. It may also be envisaged that the two PVAs have a different degree of hydrolysis. A first PVA may have a degree of hydrolysis as described above. A second PVA may have a degree of hydrolysis of at least 10%, more preferably 20%, and most preferably 30%, and a degree of hydrolysis of at most 80%, more preferably 70%, and most preferably 60%. If more than one PVA is used, the indicated degree of hydrolysis generally is the weight-averaged degree of hydrolysis of the products used. Although said PVAs are the preferred protective colloids for processes according to the invention, it is also possible to use other conventional protective colloids, such as cellulosics, water-soluble polymers, oil-soluble emulsifying agents or water-soluble emulsifying agents. Examples of such cellulosics are methyl cellulose, ethyl cellulose, hydroxyethyl cellulose, hydroxypropyl cellulose, and hydroxypropyl methyl cellulose. Examples of water-soluble polymers are polyacrylic acid, gelatin, styrene maleic acid copolymers, and polyvinyl pyrrolidone. Oil-soluble emulsifying agents are, for example, sorbitan monolaurate, sorbitan trioleate, sorbitan monostearate, glycerin tristearate, and ethylene oxide-propylene oxide block copolymers. Examples of water-soluble emulsifying agents are polyoxyethylene sorbitan monolaurate, polyoxyethylene glycerin oleate, and sodium laurate. It is also envisaged to employ a combination of two or more of the above protective colloids.

The protective colloid can be in a pure form or be diluted in an appropriate solvent, which in the case of PVA preferably is water or a mixture of water and an alcohol. Aqueous solutions may contain at least 0.05% PVA by weight, more preferably at least 0.5% by weight, and most preferably at least 1% by weight, and at most 40% PVA by weight, more preferably at most 20% by weight, and most preferably at most 10% by weight. If so desired, the amount of PVA in the solution that is actually mixed into the reaction mixture can be even lower, for instance when an aqueous protective colloid solution as presented above is fed into the reactor together with additional water that is fed to the reaction mixture.

The amount of protective colloid to be used in the process according to the invention is within the lower ranges as conventionally used in polymerization processes. Typically, this range has a lower limit of 0.01% w/w of protective colloid and more preferably 0.02% w/w, and an upper limit of 1% w/w of protective colloid, preferably 0.3% w/w, and most preferably 0.15% w/w, based on the weight of the monomer(s) to be polymerized, is used. When it is said that protective colloid and initiator are added at the same time, it is meant to include not only processes wherein initiator and protective colloid are added simultaneously or together, but also processes wherein initiator and protective colloid are added or dosed in an alternating way or sequentially in random order at the polymerization temperature (each being dosed at least twice). Also it is encompassed in the process of the present invention to dose at least part of the colloid just prior to the pressure drop.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual peroxide, more preferably less than 40 ppm, and most preferably, less than 25 ppm of peroxide, immediately after drying for 1 hour at 60° C. and screening. The resin was found to exhibit excellent heat stability as measured with a Metrastat® PSD260 testing oven according to method ISO 182-2 (1990E). The improved heat stability proved that the resin hardly discoloured when submitted to melt-processing steps, e.g., to form shaped articles.

EXPERIMENTAL

Experiments are carried out according a standard suspension polymerisation process, using a 10 l Buchi reactor provided with one baffle; three flat-bladed stirrers at three levels, a pressure transducer, a vinyl chloride (VCM) feed line, a nitrogen purge line, a peroxide feed line and a peroxide injection point. The reactor is charged with 4700 g of demineralized water; 40.2 g of a 5% solution of Alcotex® B72 (polyvinyl acetate/alcohol) in demineralized water; and pressurized with nitrogen to 15 bars. If no leaks are observed, the reactor is evacuated for 5 min at 75 mbars (while stirred) to remove the air, and subsequently charged with 2870 g of VCM (ex Akzo Nobel Salt & Base), followed by heating up the reactor to the desired polymerisation temperature of 57° C. in 30-60 minutes. After reaching a stable temperature, the initial peroxide is dosed either by the injecting point within 1 minute, the peroxide feed line during the polymerisation process or both, whatever is required. Dosing of the (very) fast peroxide through the feed line was done in such a way that the maximum rate (i.e. 33%/h) was reached in 0.5-0.65 hours. The cooling capacity was limited to a value corresponding a maximum polymerization rate of about 33%/h (the maximum of the reference experiment). The polymerisation was stopped when a pressure drop of 2 bars was reached, by cooling the reactor and degassing the reactor. After removal of the residual VCM by evacuation, the polymer was obtained by filtration, washing and drying. When an aqueous dispersion of the second initiator is dosed during the process, the expected volume dosed is subtracted from the amount of water added in the beginning, so the total amount of water will be (more or less) the same at the end of the reaction.

Experiments 1 and 2 and Comparative Example A and B

Using the experimental set-up as described, a conventional initiator (Trigonox® EHP ex Akzo Nobel) was used as the first initiator. In Comparative Example A this initiator was used as the sole initiator and it was found that the use of 656 ppm was the maximum amount that could be used whereby the reaction mixture maintained the desired reaction temperature of 57° C. In Comparative Example B this maximum amount of the initial initiator was combined with an additional amount of the second initiator.

In Examples 1 and 2, less than the maximum amount of the first initiator was used in combination with an aqueous dispersion of a second initiator, Trigonox® 187 ex Akzo Nobel. The difference of the maximum temperature that was observed and the preset temperature of 57° C. was reported in the table as T incr.

The amount of polymer as obtained is presented as the yield on monomer (yield). The table furthermore presents some properties of the resulting polymer. Psd is the average polymer particle size, and DOP is a measure for the porosity of the polymer. The time till pressure drop (CPT) as well as the time till the pressure had dropped to a value two bars below the pressure at the start of the pressure drop is also reported as a measure of the polymerization rate.

| Experiment | Tx EHP (ppm) | Tx 187 (ppm) | T incr (° C.) | Yield (%) | Psd (μm) | DOP (%) | CPT (min) | Time to −2 bar (min) |
|---|---|---|---|---|---|---|---|---|
| A | 656 | 0 | 0 | 83.4 | 155.3 | 25.9 | 197 | 226 |
| B | 656 | 310 | 6.0 | 89.1 | 154.8 | 24.8 | 139 | 170 |
| 1 | 500 | 410 | 0.8 | 86 | 153.6 | 25.5 | 146 | 177 |
| 2 | 400 | 450 | 0 | 86.3 | 161.1 | 25.5 | 154 | 184 |

From these results it follows that much faster polymerization rates are attainable without that a run away of the reaction mixture temperature is observed, when compared to conventional processes.

The PVC resulting from Experiments 1 and 2 had good organoleptic properties.

The invention claimed is:

1. A process to polymerize one or more monomers wherein at most 90 percent by weight of the safely useable amount of a first initiator is used and a second initiator, having a half-life from 0.0001 hour to 1.0 hour at the polymerization temperature and that is less temperature stable than said first initiator, is being dosed at least partially from the start of the polymerization until 10% of the monomer(s) has been polymerized, in an amount such that at least 92% of the maximum cooling capacity is used during at least a period of time wherein at least 10 percent by weight of the monomer is polymerized.

2. A process according to claim 1 wherein the monomers comprise vinyl chloride.

3. A process according to claim 2 wherein the process is a suspension polymerization process.

4. A process according to claim 1 wherein the second initiator is additionally added intermittently and/or continuously after the start of the pressure drop and/or during the pressure drop.

5. A process according to claim 1 wherein a protective colloid is added during the polymerization process.

6. A process according to claim 1 wherein said first initiator has a half-life of 0.1 hour to 10 hours at the polymerization temperature and the less temperature stable initiator has a half-life of 0.0001 hour to 1.0 hour at said temperature.

7. A process according to claim 1 wherein the amount of the second initiator that is used is at least 0.01% by weight, based on the weight of the monomer that is polymerized.

8. A process according to claim 1 wherein the total amount of first and second initiator is 0.01 to 1% w/w, based on the weight of the monomer that is polymerized.

9. A process according to claim 4 wherein the polymerization reactor has a volume of 15 $m^3$ or more.

10. A process according to claim 1 wherein said dosing of the first initiator is at a variable rate.

11. A process according to claim 3 wherein said suspension polymerization process is a batch suspension polymerization process showing a pressure drop of the vinyl chloride in the reactor.

12. A process according to claim 6 wherein a protective colloid is added during the polymerization process.

* * * * *